(12) United States Patent
Khan et al.

(10) Patent No.: US 6,199,054 B1
(45) Date of Patent: Mar. 6, 2001

(54) AUTOMATED SOFTWARE METERING OF DIGITAL PAYLOADS

(75) Inventors: Shabbir A. Khan, Cupertino, CA (US); Basit Hussain, Palm Harbor; Saeed A. Rajput, Coral Springs, both of FL (US)

(73) Assignee: Skylight Software, Inc., San Jose, CA (US)

(*) Notice: Subject to any disclaimer, the term of this patent is extended or adjusted under 35 U.S.C. 154(b) by 0 days.

(21) Appl. No.: 09/035,671

(22) Filed: Mar. 5, 1998

Related U.S. Application Data

(60) Provisional application No. 60/038,083, filed on Mar. 6, 1997.

(51) Int. Cl.[7] .................................................. G06F 17/00
(52) U.S. Cl. ............................................. 705/400; 705/52
(58) Field of Search ............................... 705/400, 39, 44, 705/54, 52; 380/23, 4

(56) References Cited

U.S. PATENT DOCUMENTS

| | | | |
|---|---|---|---|
| 4,339,807 | 7/1982 | Uchimura et al. | 705/407 |
| 4,405,829 | 9/1983 | Rivest et al. | 380/30 |
| 4,462,473 | 7/1984 | Valestin | 705/407 |
| 4,827,508 | 5/1989 | Shear | 705/53 |
| 4,829,443 | 5/1989 | Pintsov et al. | 705/406 |
| 4,868,758 * | 9/1989 | Kokubu | 705/400 |
| 4,885,777 | 12/1989 | Takaragi et al. | 380/28 |
| 4,959,795 | 9/1990 | Christensen et al. | 705/407 |
| 4,975,830 * | 12/1990 | Gerpheide et al. | 364/200 |
| 4,977,594 | 12/1990 | Shear | 705/53 |
| 4,995,081 | 2/1991 | Leighton et al. | 713/186 |
| 4,995,082 | 2/1991 | Schnorr | 380/30 |
| 5,050,213 | 9/1991 | Shear | 705/53 |
| 5,101,437 | 3/1992 | Plamondon | 382/122 |
| 5,111,512 | 5/1992 | Fan et al. | 382/122 |
| 5,195,133 | 3/1993 | Kapp et al. | 705/75 |
| 5,202,930 | 4/1993 | Livshitz et al. | 382/122 |
| 5,203,263 | 4/1993 | Berger et al. | 101/76 |
| 5,222,138 | 6/1993 | Balabon et al. | 380/23 |
| 5,280,527 | 1/1994 | Gullman et al. | 713/184 |
| 5,337,358 | 8/1994 | Axelrod et al. | 705/75 |
| 5,359,508 | 10/1994 | Rossides | 705/30 |
| 5,383,129 | 1/1995 | Farrell | 705/400 |
| 5,386,369 | 1/1995 | Christiano | 705/400 |
| 5,410,598 | 4/1995 | Shear | 705/53 |
| 5,434,928 | 7/1995 | Wagner et al. | 382/187 |
| 5,465,299 | 11/1995 | Matsumoto et al. | 705/80 |
| 5,487,100 | 1/1996 | Kane | 455/31.2 |
| 5,490,217 | 2/1996 | Wang et al. | 380/51 |

(List continued on next page.)

FOREIGN PATENT DOCUMENTS

WO 96/18939 * 6/1996 (WO).

OTHER PUBLICATIONS

Wirbel; "Three-way Alliance eyes multicast video"; Jan. 1996; Electronic Engineering times, p4; DialogWeb copy pp. 1-3.*

S. A. Rajput et al., "Method and Apparatus of Binding a New Electronic Identity With Documents", Skylight Software, Inc., pp. 1-22, 1997.

*Primary Examiner*—Emanuel Todd Voeltz
*Assistant Examiner*—Thomas A. Dixon
(74) *Attorney, Agent, or Firm*—Flehr Hohbach Test Albritton & Herbert LLP

(57) ABSTRACT

A system monitors a data payload that is being transmitted in a secure form over the Internet and provides rate computations for such payloads based on the size of the data. A data container may be implemented as a digital envelope with the bitmap (digital picture) of a stamp. The current rate for the data container is shown on the stamp and is dynamically updated as data files are added to the envelope. The overall cost is a function of the applied rate card, the size of the data and the type of security services provided.

35 Claims, 2 Drawing Sheets

U.S. PATENT DOCUMENTS

| | | | |
|---|---|---|---|
| 5,508,817 | * 4/1996 | Kunigami | 358/402 |
| 5,510,992 | 4/1996 | Kara | 705/408 |
| 5,544,255 | 8/1996 | Smithies et al. | 382/119 |
| 5,586,037 | 12/1996 | Gil et al. | 705/407 |
| 5,615,120 | * 3/1997 | Schwartz et al. | 364/464.17 |
| 5,717,597 | * 2/1998 | Kara | 364/464.18 |
| 5,768,521 | 6/1998 | Dedrick | 705/400 |
| 5,771,289 | * 6/1998 | Kuzma | 380/23 |

\* cited by examiner

AUTOMATED SOFTWARE METERING OF DIGITAL PAYLOADS

This is a continuation of Provisional Application Ser. No. 60/038,083, filed Mar. 6, 1997.

The present invention relates generally to cost metering for digital data payloads, and particularly to a system and method for metering and assessing costs for providing data transmission and security services.

BACKGROUND OF THE INVENTION

Information exchange mechanisms using the Internet have been available essentially for free to end users, who until the late 1980's were primary members of academic institutions and large companies. As of 1996, good billing models have not been developed for charging end users for Internet data transmission services. Furthermore, since data transmission security mechanisms are not widely available, there have been no major initiative in developing billing mechanisms that would rely on the end user's machine to perform data transmission cost metering, herein also called postage computation. Specifically, electronic mail (e-mail) is and has been widely available as a free service. No satisfactory billing model exists for charging the customers for this service. However, due to the large bandwidths required for multimedia and value added forms of information services, it may not be possible to maintain quality services without appropriately billing subscribers for the services they use.

Two significantly different charging models are available from the two conventional predominant mechanisms of information communication;

Mailing services, such as the U.S. postal service and various private courier services, typically bill their customers before providing services. The charges are usually based on the physical distance a package is to be transported, the mail agreements between the countries of origination and destination, the physical weight or size of the packages to be delivered, speed of service, and type of packages. Telephony services bill their customers for the time the telephone connection circuits are engaged. Customers are not billed based on the information content transmitted.

Telephone services provide options for customers to pay a monthly fee to utilize a certain amount of bandwidth between the two points whenever there is a need. Billing mechanisms for on-demand bandwidth assignment are still being worked out. Higher bandwidth in telephony is needed when a large amount of information is to be transported in a short amount of time.

Facsimile machines provide another method of information exchange that depends directly on telephony service, and thus cost is metered based on the amount of time required for document transmission, the distance between sender and receiver, and the applicable telephone usage rates.

Neither mail services nor telephone services directly base their charges on information content.

Data transmission via the Internet is faster than mailing services and is almost as fast as fax service. Furthermore, it does not provide any degradation of content quality. However, on its own, it does not protect the confidentiality of the material being delivered. Advances in the technology of information encryption and user authentication have substantially lowered the risks associated with stealing information content, making it an attractive alternative to traditional mailing services.

The current billing model used by the Internet service providers is less than satisfactory. It is based on monthly charges or the connect time. These models are neither flexible, nor can they be considered fair to the ordinary user, who may face delays in transporting his information due to problems originating from the service providers.

A secure information delivery service on the Internet could potentially outperform what is currently provided by any courier document delivery service in terms of cost, speed and security. A need is felt for providing the user with a billing mechanism using a paradigm that is already well known and accepted. Preferably, such a system should be fair in allowing for cost computation based on the package size, the level of security provided, and specific billing rules that the service provider can customize. It should also allow the user to review computed costs, for user acceptance or rejection, prior to data transmission.

SUMMARY OF THE INVENTION

The present invention provides a system and method for dynamically computing and/or assessing costs associated with Internet based content delivery. The content to be delivered can be any kind of electronic document or compound document that may contain various kinds of data, including multimedia data. The costs can be based upon the type of security services provided by the institution or the Internet Service Provider (ISP). The present invention provides the service provider the flexibility to customize their billing rules, and to provide billing rules that are fair to their end users in specific market segments. Computed billing information is dynamically updated visually as the user adds or removes items (content) to and from the payload to be transmitted. This visual update can be presented in several ways to the user.

A preferred embodiment utilizes a cost metering system that has some similarities to the one used by the U.S. postal service, where a weighting apparatus updates a display that shows the postal charges. In the preferred embodiment of the present invention, a digital payload envelope is shown on screen with a stamp (i.e., as an image, such as a bitmapped image). The value of the stamp increases as the user drags and drops more data files onto the payload envelope.

A second embodiment applies to credit customers or customers with other kinds of prepaid or charge accounts. In this case, the stamp is accompanied by a second display equivalent to a stamp dispenser that indicates the amount of remaining credit. The customer is able to add data files as long the dispenser can dispense the stamps. A modified version of this embodiment provides an allowance for an overdraft on the customer's prepaid or charge account.

A third embodiment of the invention provides a C.O.D. (charge on delivery) feature, in which the applicable charges for delivery of a digital payload envelope are deducted from the receiver's account if the receiver accepts delivery of the payload envelope. In this scenario, the receiver will be shown the charges (and optionally a list of the envelope's contents) before he or she is required to accept or decline the envelope.

A fourth embodiment of the invention assembles a separate transmittal envelope to assist in the transmission of the digital payload envelope and processing of the delivery charges. In this scenario, the transmittal envelope contains a representation of the information required for the delivery of the digital payload envelope to its intended recipient(s) and the information necessary for processing the delivery charges. The information contained in the transmittal form can also be represented in a bar coded form for automatic display and processing by the sender, any intermediate agent nodes that are authorized to process it, and the recipient(s). The information contained in the transmittal form envelope is made more secure using cryptography techniques.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
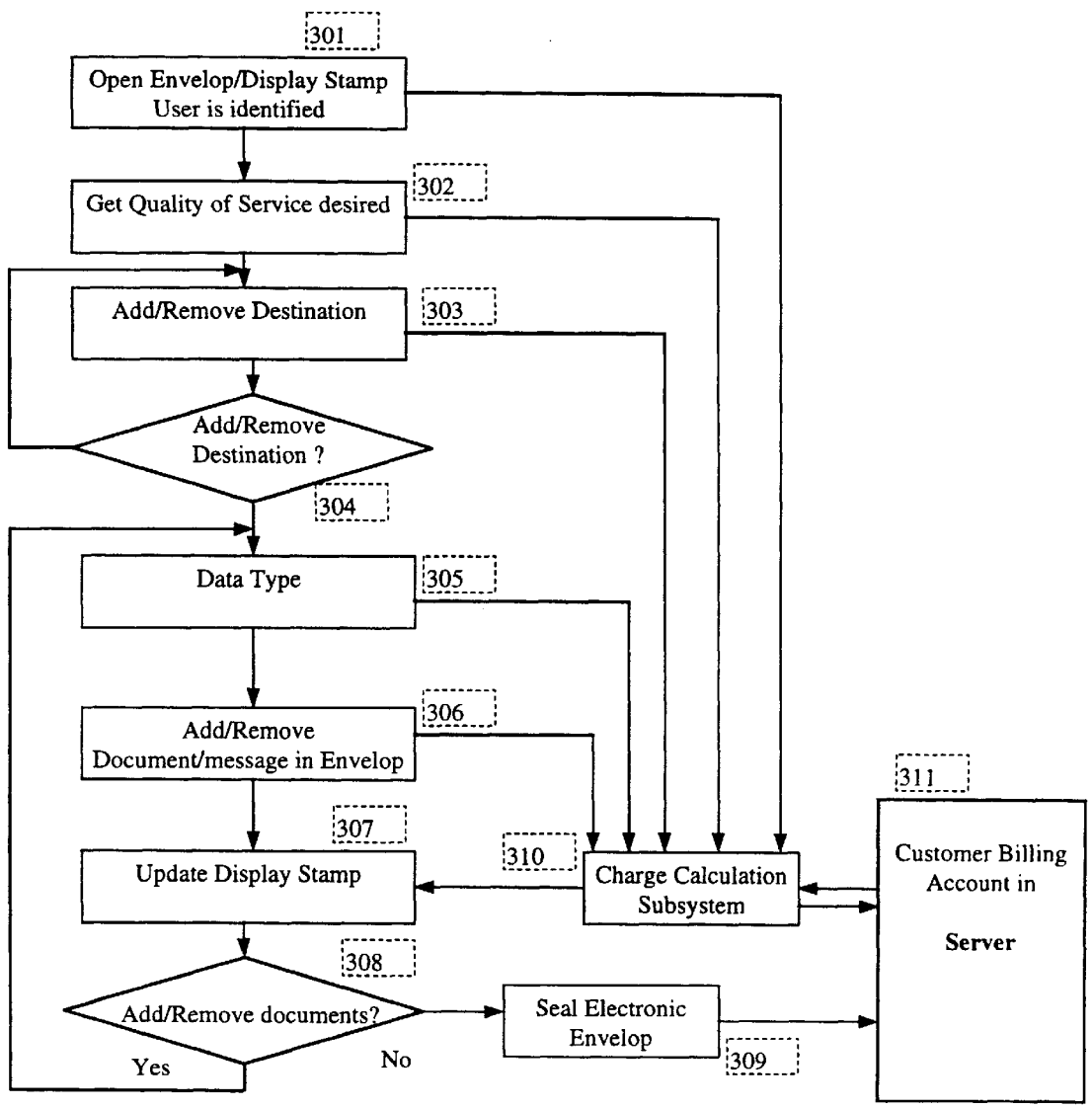
FIG. 1 is a flow chart for one embodiment of the present invention. It depicts how multiple destinations can be added for the same envelope and how multiple compound documents can be enclosed in the same envelop.
Figure 2:
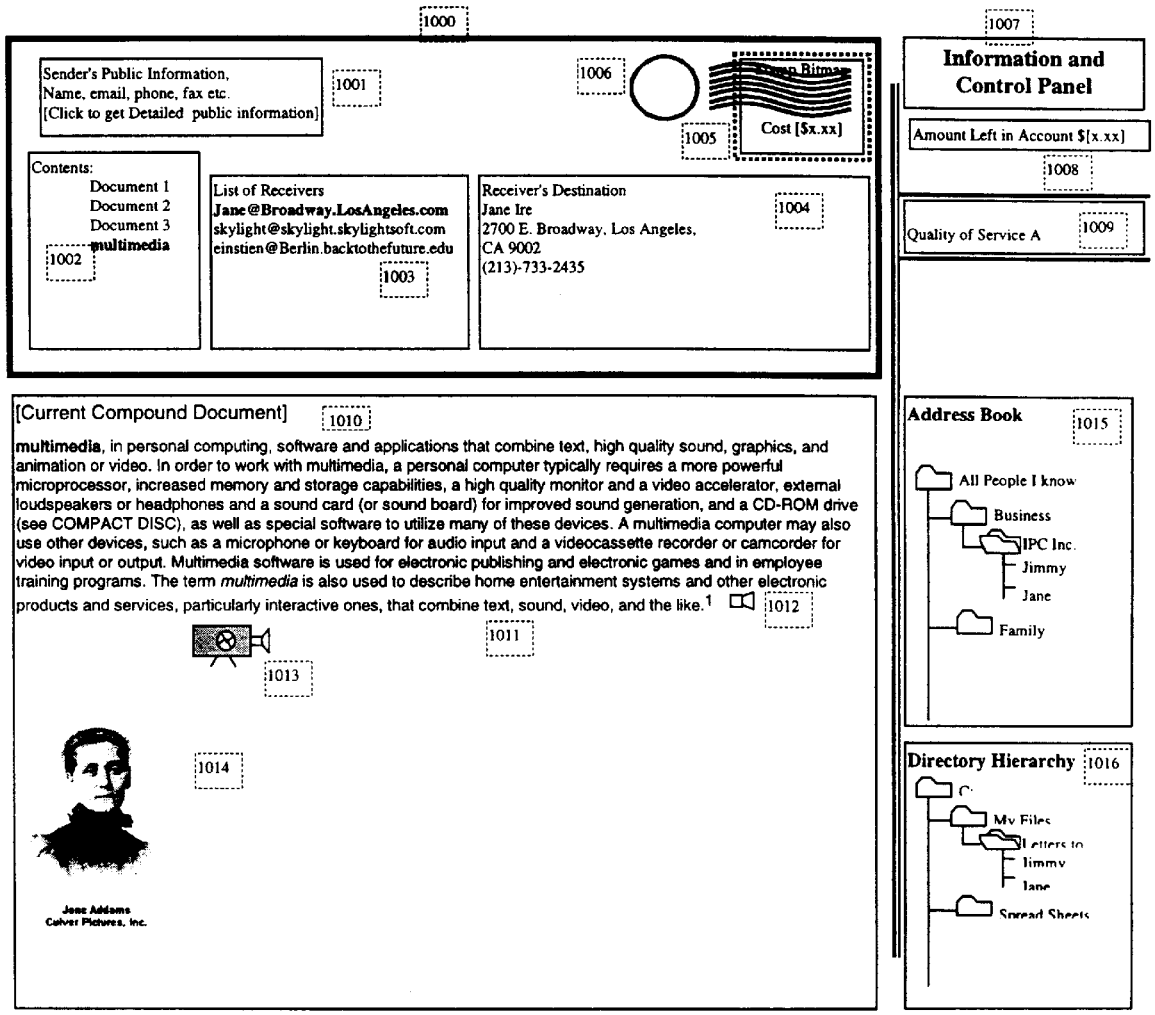
FIG. 2 shows the user interface environment in one embodiment of the present invention.

FIGS. 1 and 2 are complementary, and therefore will be described simultaneously. In 301, as soon as an electronic envelope 1000 is opened, the user is identified and a brief summary of his public information is displayed in 1001. At any time, detailed user information can be obtained by double clicking the box 1001. The detailed user information is provided in a pop-up dialog box that does not otherwise alter the operation of this application.

The user at anytime can select the desired quality of service for a particular recipient or everyone on the recipient's list by selecting it from the box 1009. A brief description of quality of service is displayed just below the box 1009. In the shown flow chart, the user selects quality of service in 302. However, he can change it anytime before he sends the payload envelope. Changing the quality of service will typically affect the cost by changing the applicable rate table (sometimes called a rate card).

The user can add or remove destinations as indicated by 303 and 304. Unlike conventional mailing services, a single envelope can be sent to multiple destinations. To add a destination, the user simply picks the destination from address book 1015 and drops it into the envelope. To view the details of a destination, the user can select it in the box 1003. The details are shown in the view area 1004. To remove a destination, the user selects the destination in box 1003 and presses the delete key on the user's keyboard. This will only remove the selected destination(s) from the box 1003. The contents of Address Book 1015 are not be effected. Depending upon the billing scheme, adding multiple destinations may increase the cost.

Each time a destination is added or removed, system stays in the mode of adding or removing destination(s) by automatically following the YES path out of 304. However, user can exit the add/remove destination mode by following the NO path out of 304 anytime. The NO path is taken from the add/remove destination mode anytime the user chooses a different graphical user interface action e.g. 306 to add/remove document or 309 to seal and send the envelope.

The user can add or remove as many compound documents to the payload envelope as he likes as shown by 306 and 308. As a result of each addition of the document, the cost indicator 1005 is updated as indicated in 307. The cost indicator 1005 also displays a picture or artwork very similar to a traditional postage stamp. The cost indicator 1005 and the stamp usage indicator 1006 are protected from tampering by the sender, recipient or any intermediate agent node on the network using standard encryption techniques. System starts off with a default data type which gets updated in 305 by new data type(s) as soon as the system detects addition of a new document. When a document is added, the data type box 305 automatically detects the type of the document and informs the charge calculation system 310 of the type of data. To add a document, the user picks a document from the directory hierarchy 1016 and drops it on the payload envelope. The name of the document will appear in the Contents box 1002. The most recent document will be displayed be default in box 1010. However, the user can select any document in the contents box 1002 to display the contents in box 1010. The compound documents in this application can be of any type or a concatenation of different types, including multimedia documents (shown) that have text (1011), audio (1012), movie (1013) or images (1014). The documents in a payload envelope can also contain source code, executable code or any other type of data.

While executing steps 306 and 308, system stays in the mode of adding or removing document(s) by automatically following the YES path out of 308. However, user can exit the add/remove document mode by following the NO path out of 308 anytime. The NO path is taken from the add/remove document mode anytime the user chooses a different graphical user interface action e.g. 309 to seal and send the envelope or 303 to add/remove a destination.

The system allows the user to choose different actions, e.g. dragging and dropping of objects, throughout the session with the help of the graphical user interface. Although FIG. 1 shows a sequential process to illustrate the main logic, the graphical user interface allows the user to execute as many steps e.g. 302, 303, 306 in any sequence prior to sealing and sending the envelope by 309 to meet user's needs. The Information and Control Panel 1007 in FIG. 2 may show more displays in addition to the Stamp Dispenser 1008, Quality of Service 1009, Address Book 1015 and Directory Hierarchy 1016. It is within the scope of the invention to include all steps necessary to make the graphical user interface as intuitive as possible without departing from the principles of the invention.

When the user is satisfied with the contents, destinations, quality of service and cost, he can press the send button to initiate the act of sending the document 309. The act of sending also seals the payload envelope prior to its transmission. The payload envelope is typically sealed by encryption of its contents, and/or the addition of a digital signature or digital identifier to the payload envelope. The digital signature or identifier is a function of the payload envelope's contents, as well as the identify of the sender. The computed cost is deducted from the Customer billing account of the sender or its designated agent which is maintained on the Billing Server 311. Once the computed cost has been charged to an account, the cost indicator stamp 1005 displays an additional graphics to represent the stamp usage indicator 1006. The stamp usage indicator visually represents the fact that the stamp has been used and can not be used by anyone for any other transmission.

In all of the above, it assumed that the cost is computed using charge calculation system 310, which performs its calculation based on the several inputs it receives. The output of the charge calculation system 310 is displayed in the Stamp box 1005. The billing rules used for incrementing or decrementing the billing amount shown on the stamp utilize several parameters. These parameters include the size of the document, type of document, the type of compression used on the contents, the type of encryption provided for securing the document urgency of the delivery, the type of services the user subscribes to and is using in a communication including but not limited to the time stamping service and/or the notary service to get a particular piece of a document notarized by an authorized notary service electronically. The billing rules may be based on flat rate billing, linear payload size billing, piecewise linear billing, as well as table lookup methodologies.

A flat rate billing rule charges the same amount of money for a digital payload envelope regardless of the state of the billing parameters. A linear payload size billing rule increments the stamp value in direct proportion to the size of the payload. A piecewise linear billing rule allows for different rate values to be assigned to different size ranges as the payload size increases. Additional charges may be added for additional services not included in the basic billing rates, such as for using proprietary encryption techniques instead of public domain encryption techniques. The service provider can define rules or payment metrics that conform to the service provider's specific needs.

In a second embodiment, for customers with prepaid or charge accounts, the stamp is accompanied by a second display 1008 equivalent to a stamp dispenser that indicates the amount of remaining credit. The customer is able to add data files as long the dispenser can dispense the stamps. The prepaid/charge account mechanism can be configured to allow for a predefined overdraft on the customer's prepaid or charge account.

In a third embodiment, the sender can request that the recipient(s) be charged for the data transmission services, using a C.O.D. (charge on delivery) option. The applicable charges for delivery of a digital payload envelope are deducted from the receivers account if the receiver accepts delivery of the digital payload envelope. In this embodiment, the receiver is shown the charges (and optionally a list of the payload envelope's contents) before he or she is required to accept or decline the payload envelope. Both the sender and the receiver may optionally designate another node on the network as an agent node responsible for making payments on behalf of the sender or recipient and/or forwarding the digital payload envelope to the recipient(s).

In a fourth embodiment, the sender can assemble, in addition to preparing the digital payload envelope, a separate transmittal form envelope. The transmittal form envelope, as part of its contents, includes a representation of the applicable charges and additional fields including sender's identity, sender's address, sender's digital signature, identity/address of each recipient, identity of the digital payload envelope, each transmission's identity/time stamp, quality of service information, comments and instructions for processing the contents of the transmittal form and the digital payload envelopes.

In this embodiment, the transmittal form envelope can be processed by the sender, recipient(s) and any other authorized agent nodes participating in the transmission process and/or are involved in ensuring that the computed costs get charged and are paid by the responsible party or parties.

It should be noted that the words including "charge" and "bill" are used herein in the broad sense. The act of charging or billing always requires an authorized party or an account to charge and a mechanism to charge e.g. the billing server 311 including any clearing house services used by the billing servers associated with the sender or recipient or an authorized agent.

Some or all of the information contained in the transmittal form envelope can also be represented in a bar coded form for automatic display and processing by the sender, recipient (s) and any intermediate agent nodes that are authorized to process it. The information contained in the transmittal form envelope can be encrypted to ensure a securer handling of both the transmittal form and the payload envelopes by the sender, agent nodes, and the recipient(s). In this embodiment, both the digital payload and the transmittal form envelopes can be transmitted together or separately on the same communications channel or on separate channels.

In this embodiment, multiple copies or versions of the transmittal form and the digital payload envelope are required depending upon the number of encryption keys being used, the number of recipients, and the number of parties involved in the transmission and charging for the delivery of the contents of the digital payload envelope. This embodiment, additionally, allows an intermediary agent node acting on behalf of multiple recipients, to aggregate and consolidate the envelopes if needed.

What is claimed is:

1. A method of cost metering for providing data transmission services, comprising steps of:

accepting user specification of data files to be transmitted;

accepting user specification of one or more destinations to which the user specified data files are to be transmitted;

accepting user specification of data handling services to be provided in conjunction with transmission of the user specified data files, the user specified data handling services being selected from a predefined set of services that comprise compression, encryption, time stamping, and delivery services;

computing of a cost associated with transmission of the user specified data files, the cost being based on one or more of the specified data handling services;

displaying a pictorial representation of a digital payload envelope that does not include the user specified files, the digital envelop comprising a representation of the computed cost, the representation being displayed to a recipient at the one or more destinations; and, upon receipt of a user command from the recipient that indicates acceptance of the cost, transmitting a digital payload envelope including the user specified data files.

2. The method of claim 1, further comprising a step upon receipt of the user command of debiting the computed cost from an account associated with an entity selected from a group consisting of a sender, the recipient, and an authorized agent, the account being associated with a prior account selection made by the sender.

3. The method of claim 1, wherein the computed cost is a function of an amount of data to be transmitted.

4. The method of claim 1, wherein the computed cost is a function of the user specified data handling services.

5. The method of claim 1, further including:

assembling a transmittal form envelope, for use in conjunction with delivery of the digital payload envelope, the transmittal form envelope having multiple fields for storing data representing sender identification, the destinations to which the user specified data files are to be transmitted, identity of the digital payload envelope, and the user specified data handling services; and, transmitting the digital payload envelope and the transmittal form envelope together.

6. The method of claim 5, wherein at least a subset of the fields of the transmittal form envelope are represented in a bar coded form.

7. The method of claim 6, wherein the bar coded fields are displayed and processed by an entity selected from a group consisting of the sender, the recipient and an authorized intermediate agent node.

8. The method of claim 5, wherein at least a subset of the fields of the transmittal form envelope are encrypted.

9. The method of claim 5, wherein the step of assembling further comprises a step of generating multiple copies or versions of the transmittal form envelope to meet security and quality of service needs.

10. The method of claim 1, wherein the step of sending further comprises a step of creating multiple copies of the digital payload envelope to meet security and quality of service needs.

11. The method of claim 5, wherein the step of assembling further comprises a step of aggregating a set of authorized digital payload envelopes into the digital payload envelope.

12. A method of cost metering for providing data transmission services, comprising the steps of:
   transmitting, by a sender, a request to compute a cost of transmitting a digital payload, the request being sent to a billing server, the request to compute including a set data handling services comprising a size of the digital payload, a set of data types comprising the digital payload, an encryption method used to encrypt at least a subset of the digital payload, and a quality of delivery service;
   calculating a cost, by the billing server, based on at least a subset of data handling services;
   communicating a response, by the billing server, to the sender, the response representing both the cost to send the digital payload to the recipient; and,
   in response to receiving the response, sending, by the sender, a digital payload envelope to the recipient, the digital payload envelope comprising the digital payload.

13. The method claim 12, further comprising a step of debiting, by the billing server, the cost from an account selected from a group consisting of a sender account associated with the sender, a recipient account associated with the recipient, and an agent account associated with at least a subset of the sender and the recipient.

14. The method of claim 13, wherein the step of debiting further comprises a step of charging an account for an amount of money that is greater than the amount of money in the account.

15. The method of claim 12, further comprising steps of:
   accepting a set of user specifications of data files to be transmitted as part of the digital payload;
   accepting a set of user specifications of one or more destinations to which the user specified data files are to be transmitted; and,
   accepting a set of user specifications associated with the data handling services.

16. The method of claim 12, further comprising a steps of:
   generating a separate transmittal form envelope to ensure proper handling and charging for delivery of the digital payload envelope, the transmittal form envelope comprising multiple fields, comments, and instructions; and,
   processing, by at least a subset of entities comprising the sender, the recipient, and an authorized agent, of the transmittal form envelope to determine associated charges and one or more destinations of the digital payload envelope; and,
   wherein the step of sending further comprises a step of sending the digital payload envelope and the transmittal form envelope together or separately; on the same channel or on different channels.

17. The method of claim 16, wherein the step of assembling, at least a subset of the fields are in a bar coded form.

18. The method of claim 16, wherein the step of assembling, at least a subset of the fields are encrypted.

19. The method of claim 16, wherein the step of assembling further comprises a step of generating multiple copies or versions of the transmittal form envelope to meet security and quality of service needs.

20. The method of claim 16, wherein the step of communicating, the response includes an authorization to aggregate more than one digital payload in a digital payload envelope; and, wherein the step of sending further comprises a step of aggregating more than one digital payload into the digital payload envelope.

21. The method of claim 12, wherein the step of sending further comprises a step of sealing the digital payload envelope using at least a subset of methods comprising encryption and a digital signature to ensure that the digital payload envelope is only accessible by an intended recipient.

22. The method of claim 12, wherein the step of sending, the digital payload envelope further comprises a stamp that represents the cost and a stamp dispenser indicating an amount of credit remaining in an account associated with the recipient.

23. The method of claim 12, wherein the step of transmitting, the billing server maintains a set of accounts associated with a set of entities selected from a group consisting of the sender, a recipient, and an authorized agent, the billing server also maintaining a set of authorized data handling and delivery services associated with at least a subset of the set of entities.

24. The method of claim 12, wherein the step of sending does not involve the billing server.

25. A computer program product for use in conjunction with a processor, the computer program product comprising a first computer readable storage medium and a computer program mechanism embedded therein, the computer program mechanism comprising a controller configuration system procedure, the controller configuration system procedure including instructions for:
   transmitting, by a sender, a request to compute a cost of transmitting a digital payload, the request being sent to a billing server, the request to compute including a set data handling services comprising a size of the digital payload, a set of data types comprising the digital payload, an encryption method used to encrypt at least a subset of the digital payload, and a quality of delivery service;
   calculating a cost, by the billing server, based on at least a subset of the set of data handling services;
   communicating a response, by the billing server, to the sender, the response representing the cost for the sender to send the digital payload to the recipient; and,
   in response to receiving the response, sending, by the sender, a digital payload envelope to the recipient, the digital payload envelope comprising the digital payload.

26. The computer program product of claim 25, further comprising instructions for debiting, by the billing server, the cost from an account selected from a group consisting of a sender account associated with the sender, a recipient account associated with the recipient, and an agent account associated with at least a subset of the sender and the recipient.

27. The computer program product of claim 25, further comprising instructions for:
  accepting a set of user specifications of data files to be transmitted as part of the digital payload; and,
  accepting a set of user specifications of one or more recipients to which the user specified data files are to be transmitted.

28. The computer program product of claim 25, further comprising instructions for:
  generating a separate transmittal form envelope to ensure proper handling and charging for delivery of the digital payload envelope, the transmittal form envelope comprising multiple fields, comments, and instructions; and,
  processing, by at least a subset of entities comprising the sender, the recipient, and an authorized agent, of the transmittal form envelope to determine associated charges and one or more destinations of the digital payload envelope; and,
  wherein the step of sending further comprises a step of sending the digital payload envelope and the transmittal form envelope together or separately; on the same channel or on different channels.

29. The computer program product of 28, wherein the instructions for assembling, at least a subset of the fields are represented in a bar coded form.

30. The computer program product of claim 28, wherein the instructions for assembling, at least a subset of the fields are encrypted.

31. The computer program product of claim 28, wherein the instructions for assembling further comprises instructions for generating multiple copies or versions of the transmittal form envelope to meet security and quality of service needs.

32. The computer program product of claim 28, wherein the instructions for communicating, the response comprises an authorization to aggregate more than one digital payload in a digital payload envelope; and, wherein the instructions for of sending further comprises instructions for aggregating more than one digital payload into the digital payload envelope.

33. The computer program product of claim 25, wherein the instructions for sending further comprises instructions for sealing the digital payload envelope using at least a subset of methods comprising encryption and a digital signature to ensure that the digital payload envelope is only accessible by an intended recipient.

34. The computer program product of claim 25, wherein the instructions for sending, the digital payload envelope further comprises a representation of the cost and a stamp dispenser indicating an amount of credit remaining in an account associated with the recipient.

35. The computer program product of claim 25, wherein the instructions for sending do not involve the billing server.

* * * * *